Patented Sept. 20, 1932

1,878,675

UNITED STATES PATENT OFFICE

GERALD H. COLEMAN AND LINDLEY E. MILLS, OF MIDLAND, MICHIGAN, ASSIGNORS TO THE DOW CHEMICAL COMPANY, OF MIDLAND, MICHIGAN, A CORPORATION OF MICHIGAN

PREPARATION OF PRIMARY AROMATIC AMINE HYDROHALIDES OF THE BENZENE SERIES

No Drawing.   Application filed September 14, 1929.   Serial No. 392,724.

The present invention involves methods for preparation of amine hydrohalides, particularly aromatic amine hydrohalides, and more particularly methods for the preparation of aniline hydrochloride.

Hitherto, aniline hydrochloride usually has been made industrially in aqueous solution, by dissolving aniline in concentrated aqueous hydrochloride acid and crystallizing said aniline hydrochloride therefrom. Since the latter is soluble in water, it is necessary to concentrate the mother liquors repeatedly in order to crystallize more product therefrom. The product from each crystallization is separated and dried. Aniline hydrochloride so prepared is ordinarily discolored, or becomes so upon standing a short time, hence the colored aqueous solution of the latter is oftentimes decolorized with a material such as stannous chloride before the product is allowed to crystallize, such treatment, however, thus adding a metal salt impurity to the solution.

A well known method for the laboratory preparation of amine hydrohalides consists in passing a hydrogen halide gas into or over the surface of a solution of a free amine in a non-aqueous solvent in which the amine hydrohalide is but very slightly soluble, whereby the latter precipitates from the solution. For instance, Hoffman (Lassar Cohn; Arbeits Methoden, 4th Ed., 1907, Spl. part, pg. 127: Leopold Voss Pub.) obtained crystalline ethyl aniline hydrochloride by passing gaseous hydrogen chloride into an ether solution of the free base. Ullman (Ber. 31—1699; 1898) prepared the hydrochlorides of aniline, the toluidines and xylidines by conducting the said gaseous acid into carbon tetrachloride solutions of the respective amines.

We have now found that the last mentioned method, in which a non-aqueous solvent is employed, may be improved so as to eliminate certain disadvantages of said method. Such improvements involve the use of a solvent in which both the free amine and the hydrohalide thereof are soluble. Accordingly, upon reacting between an amine and a gaseous hydrogen halide in such solvent, a solution of the product is obtained instead of a crystal precipitate, and such solution may be filtered or otherwise treated to purify it before separation and isolation of the salt. Furthermore, if an impure discolored amine has been used, such solution of the product may be decolorized before the evaporation or crystallization step. Moreover, when the solution is evaporated to obtain crystals, or, if the reaction has been carried out in a more concentrated solution and at a higher temperature, when such concentrated solution is cooled to form crystals, the crystal size of the product may be varied by controlling the evaporation and cooling steps. Accordingly, a pure, white, crystalline product of a controllable size and which is completely water-soluble, is obtained without resorting to the use of an aqueous solvent, which causes a partial dissociation of the product into its components. Other objects and advantages of our invention will become apparent as the description proceeds.

To the accomplishment of the foregoing and related ends, the invention, then, consists of the method hereinafter fully described and particularly pointed out in the claims the following description setting forth in detail several modes of carrying out the invention, such disclosed modes illustrating, however, but several of various ways in which the principle of the invention may be used.

By way of illustration, we shall describe our improved method as applied to the manufacture of aniline hydrochloride. A typical procedure is as follows. Aniline is dissolved in ethyl alcohol, and into or over the surface of the solution gaseous hydrogen chloride is passed, which reacts with the aniline to form aniline hydrochloride, the latter remaining in solution. The solution may then be treated in any manner to remove turbidity, color, and/or solid matter, if such be present, such as by filtration and/or decolorization. The solution is then evaporated in any suitable manner to form crystals of the product, i. e. aniline hydrochloride, which may be removed at intervals during said evaporation, or the solution may be evaporated to substantial dryness without the intervening removal of product, the latter then being obtained as a crystalline residue from such evaporation.

Other modes of procedure may also be employed. For instance, in carrying out the abovementioned reaction between the gaseous acid and aniline, the solution of the latter may be maintained at an increased temperature, e. g. at the refluxing temperature, while the reaction proceeds. The starting concentration of aniline in the alcohol may be such that at the increased temperature, the product remains entirely in solution, and that when the reaction mixture has cooled, a portion of the product will separate in the form of crystals. The latter may be removed, and the mother liquor evaporated to recover more crystals, or if preferred, such mother liquor may again be heated after addition of more aniline and the latter then reacted with hydrogen chloride as abovementioned, or, the initial concentration of the alcoholic amine solution may be such that the product may be merely partially dissolved, the remainder separating from the reaction mixture as a solid.

The process may be carried out under increased pressure if desired, and may be adapted to continuous operation.

The following detailed examples are given for the purpose of illustrating our improved invention, but it is understood that such examples are not to be interpreted as a limitation upon the invention.

Example 1

108 grams of aniline was dissolved in 150 cubic centimeters of ethyl alcohol (95 per cent), and gaseous hydrogen chloride passed thereinto until the solution showed an acid reaction to Congo Red indicator. The temperature was allowed to rise to approximately the boiling point of the reaction mixture. After completion of the reaction, the solution was cooled to 20° C. and filtered from the crystals of aniline hydrochloride formed. The latter, in the form of pure white crystals (M. P. 198° C.), amounted to 68 per cent of the theory. The mother liquor was evaporated until the residual solution was saturated at its boiling point with product, cooled, and filtered from the crystallized aniline hydrochloride, the quantity of the latter obtained in pure white form (M. P. 198° C.) being 13.5 per cent of the theory. Upon evaporating the second mother liquor to dryness, in vacuo, a crystalline product was obtained in quantity sufficient to make the total yield substantially quantitative.

Example 2

O-toluidine hydrochloride was prepared from 98.4 grams of the corresponding amine, in a manner similar to that described in Example 1. The yield of pure, white product (M. P. 214–214.5° C.) was 47 per cent from the first crystallization, 30 per cent from the second crystallization, and the total yield was raised to substantially quantitative by evaporating the residual liquor to dryness in vacuo, whereby additional crystalline product was obtained.

Example 3

100 grams of aniline was dissolved in 200 cubic centimeters of iso-propyl alcohol and gaseous hydrogen chloride passed thereinto until the solution reacted acid to Congo Red indicator. The alcohol was then evaporated off in vacuo, the dried residue of pure, white crystalline aniline hydrochloride (M. P. 198° C.) amounting to a practically theoretical yield.

The invention is not limited to the materials specifically mentioned in the examples. Other equivalent amines, e. g. the alkyl or aromatic amines, or substituted derivatives thereof, may be used.

The hydrogen halide gas utilized in the present procedure, i. e. hydrogen bromide or hydrogen chloride, may be diluted with a gas unreactive with the reaction components, e. g. nitrogen. The expression "hydrogen halide" in the claims refers to either hydrogen bromide or hydrogen chloride, and the term "hydrohalide" is meant to represent a hydrobromide or hydrochloride.

Other solvents may be employed in our present improved process, e. g. other volatile hydroxy compounds or the lower members of the aliphatic alcohol series such as methyl, propyl, butyl or isobutyl alcohol. Such solvents as well as the reaction components should not contain more than small amounts of water, such, for example, as the water content of ordinary commercial 95 per cent ethyl alcohol.

Furthermore, evaporation of the solvent from the reaction product removes small amounts of water, if present, from the reaction mixture, and the product accordingly is obtained in the dry state. Said solvent evaporation may be performed in the presence of excess hydrogen halide, for instance, by continually or intermittently passing the halide gas into the solution being evaporated.

The reaction and evaporation steps may be performed in the absence of air or oxygen, for instance, such operative steps may be carried out in an atmosphere of nitrogen and/or of the solvent employed.

Among the advantages of our improved method may be noted, (1) the product is obtained in solution, hence the latter may be worked as desired to remove turbidity, color or solid materials if present, (2) the size of the product crystals may be varied by controlling the temperature and the evaporation and crystallization steps, (3) dissociation of the product into amine and acid components is substantially eliminated, (4) the final dry product may be obtained from the reactor, thus eliminating several operative steps, and (5) the amine hydrohalide is obtained in white, pure, crystalline form of controllable size, and of better quality than the usual commercial grade.

Briefly reviewed, our invention involves reacting between a hydrogen halide gas and an amine dissolved in a solvent wherein both the amine and the produced amine hydrohalide are soluble, and in such manner that the product may remain in solution; after the practical completion of which reaction, the solution may be treated as preferred to remove impurities, and the said product crystallized therefrom in any preferred manner.

Other modes of applying the principle of our invention may be employed instead of those explained, change being made as regards the process herein disclosed, provided the means stated by any of the following claims or the equivalent of such stated means be employed.

We therefore particularly point out and distinctly claim as our invention:—

1. In a method of preparing a primary aromatic amine hydrohalide of the benzene series, the step which consists in reacting a primary aromatic amine with a gaseous hydrogen halide in the presence of a lower aliphatic alcohol.

2. In a method of preparing an aniline hydrohalide, the step which consists in reacting aniline with a gaseous hydrogen halide in the presence of a lower aliphatic alcohol.

3. In a method of preparing aniline hydrochloride, the step which consists in reacting aniline with gaseous hydrogen chloride in the presence of a lower aliphatic alcohol.

4. In a method of preparing aniline hydrochloride, the step which consists in reacting aniline with gaseous hydrogen chloride in the presence of ethyl alcohol.

Signed by us this 11 day of September, 1929.

GERALD H. COLEMAN.
LINDLEY E. MILLS.